April 2, 1946.        L. M. SIGLER ET AL        2,397,698
REMOVABLE CONVEYER PAN FOR EGG OPENING MACHINES
Filed March 23, 1943
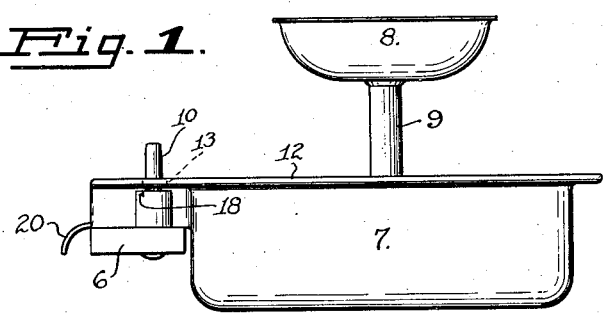
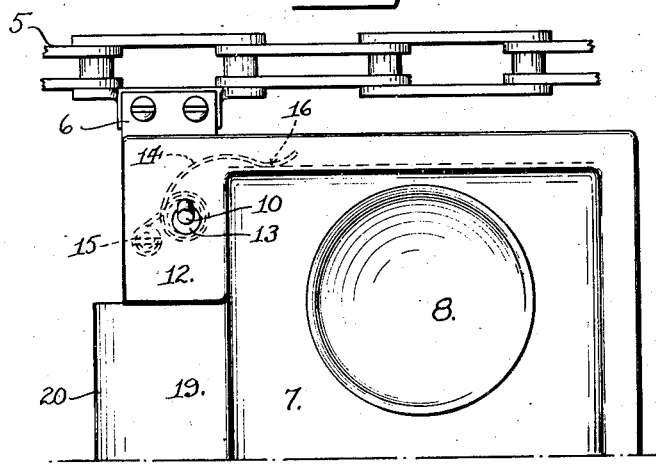
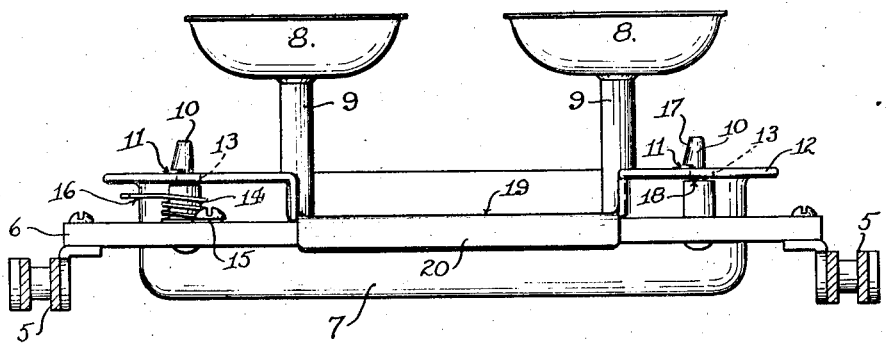
INVENTORS
Lawrence M. Sigler
James C. Gill
BY
William F. Booth Jr.
ATTORNEY.

Patented Apr. 2, 1946

2,397,698

UNITED STATES PATENT OFFICE 2,397,698

REMOVABLE CONVEYER PAN FOR EGG OPENING MACHINES

Laurence M. Sigler, Washington, D. C., and James C. Gill, San Francisco, Calif., assignors of one-third to Kathryn B. Gill, Indianapolis, Ind.

Application March 23, 1943, Serial No. 480,254

5 Claims. (Cl. 198—131)

The present invention relates to conveyers of the type commonly used in egg opening machines, in which a series of removable shallow pans are carried by a pair of endless chains.

An example of such an egg opening machine is described in United States Patent No. 2,229,349, issued January 21, 1941, upon application of Laurence M. Sigler, and the present invention is an improvement in the removable conveyer pan disclosed in said patent. It will be apparent, however, that the present invention may be embodied in conveyers for other purposes, and it is to be understood that changes within the scope of the appended claims may be made in the form, construction and arrangement of the several parts herein described and illustrated, without departing from the spirit of the invention as defined in said claims.

In egg opening machines, the contents of the opened eggs are dropped, either with or without separation as between yolks and whites, into moving pans which carry them from the opening station to a more or less remote point and there dump them, as the conveyer runs over its end sprockets, into one or more receptacles. In such machines it is necessary to make the pans in such a manner that they can be quickly removed from the conveyer and replaced thereon, so that when a spoiled egg is opened and its contents dropped into a pan, that pan can be removed from the conveyer to prevent its spoiled contents from mingling with and contaminating the rest of the egg contents in the receiving container. A clean pan is replaced on the conveyer in order that there may be no break in the continuity of successive pans, and the contaminated pan is emptied and washed to await another replacement.

The principal object of the present invention is to provide a conveyer pan which is easily and quickly removable from its carrying chains, but which will not fall or remove itself when inverted on the return run of the conveyer. Other objects and advantages will be apparent from the following description, and from the accompanying drawing, in which Fig. 1 is a side elevation of the pan mounted upon a cross bar of the conveyer.

Fig. 2 is a plan of one longitudinal half of the pan and a portion of the conveyer.

Fig. 3 is an end elevation of the pan as seen from the left of Fig. 2, the conveyer chains being shown in section.

In the drawing, the reference numerals 5 designate a pair of spaced parallel conveyer chains, connected together at intervals by cross bars, one of which is shown at 6. Each cross bar supports a removable pan 7 adapted to receive the egg contents. The pan herein illustrated is designed for a double-row machine, in which two eggs are opened simultaneously and their contents dropped into the same pan, and in which the yolks are separated from the whites. The chains operate over suitable sprockets and guiding means, and have a substantially horizontal carrying run and an inverted return run. The sprockets and guiding means and the return run are common practice in conveyer construction, and have been omitted from the drawing for the sake of clearness.

It is well understood in the art that in machines of this type the contents of each egg is caused to drop first into a yolk cup 8, supported on a stem 9 rising from the bottom of the pan 7, and that the yolk remains in said cup while the white flows over the edge and falls into the pan 7. There are two cups 8 in the pan herein illustrated, to receive the yolks of two eggs opened simultaneously, but any practicable number of such yolk cups may be mounted in each pan, depending upon the number of eggs which the machine is designed to open at one time. A succession of regularly spaced pans 7 are carried along, from right to left in Figs. 1 and 2, by the chains 5, and are emptied when tilted by the passage of the chains over their end sprockets, not shown herein. Suitable receptacles, also not shown, are positioned to catch separately the yolks as they fall from the cups 8 and the whites as they are poured out of the pans 7, all in a manner well known in the art. The empty pans are inverted on the return run of the chains.

The cross bar 6 has two upstanding studs 10 which have notches 11 on one side, the notches of both studs facing toward the same side of the conveyer. The pan 7 has a flat rim 12, in which are two holes 13 spaced to fit over the studs 10 and engage the notches 11, constituting a bayonet lock type of connection. A spring 14, consisting of a length of wire wound around one of the studs 10, has one end fixed to the cross bar at 15 and its other end bears against the side of the pan at 16. The spring, therefore, presses the pan sideways in a direction to cause its rim 12 to lock in the notches 11 of the studs 10. The upper ends of said studs are beveled as at 17, to facilitate fitting the holes 13 over them, and they may have shoulders 18 below the notches upon which the rim of the pan rests.

The rim 12 is depressed as shown at 19 between the two studs, and its edge is extended and curled downwardly, as at 20, forming a pouring lip to discharge the egg whites over and away from the cross bar 6 when the pan is tilted.

It will be seen that the pan 7, when in the position shown, is locked to the cross bar 6, and will not drop off when inverted. In order to remove the pan, however, it is only necessary to shift it sideways, against the pressure of the spring 14, and lift it up. It is replaced by fitting its holes 13 over the studs 10 and pressing down until the notches 11 engage the rim.

It will also be appreciated that the chains 5 and cross bar 6 constitute the carrying member of a conveyer, having a longitudinal advancing movement, that the pan 7 is removably held by and locked to said carrying member by the cooperating notched studs 10 and holes 13, and that locking and unlocking of said pan is accomplished by a shifting movement transverse to the advancing movement of the carrying member.

The particular advantage in our present pan is that it is removable only by a shifting movement sideways, i. e. transverse to the direction of travel of the conveyer. In other types of pan, such as that disclosed in Patent No. 2,229,349 hereinbefore referred to, the shifting movement necessary to unlock and remove the pan is parallel to the movement of the conveyer, and sometimes such shifting will occur unexpectedly and the pan will drop off when it tilts over the end sprockets, or when the movement of the conveyer is irregular or jumpy on account of slack in the chains or drive mechanism. In the present construction, the movement of the conveyer has no effect on the locking of the pans.

A further advantage in the present transverse unlocking movement is that it is more convenient for the operator, who stands beside the conveyer. It is easier and quicker for him to push the pan away from him or pull it toward him than to shift it longitudinally of the moving conveyer.

We claim:

1. In a conveyer, a pair of spaced chains, a cross bar carried thereby, a removable pan supported by said cross bar, a flange on said pan positioned above said cross bar, locking means on said cross bar and said flange cooperating to secure said pan to said cross bar, said flange having a depressed portion, and a pouring lip extending from the edge of said depressed flange portion over the edge of said cross bar.

2. In a conveyer, a pair of spaced chains, a cross bar carried thereby, a removable pan supported by said cross bar, a pair of notched studs rising from said cross bar, a flange on said pan overlying said cross bar, said flange having a pair of apertures positioned to fit over said studs and engage said notches to lock said pan to said cross bar, said flange having a depressed portion between said apertures, and a pouring lip extending from the edge of said depressed flange portion over the edge of said cross bar.

3. In a conveyer, a pair of spaced chains having a substantially horizontal carrying run and an inverted return run, a cross bar carried thereby, a stud rising from said cross bar substantially at right angles thereto, said stud having a notch in its side facing one of said chains, a removable and transversely shiftable pan having a flange resting upon and supported by said cross bar during the carrying run, said flange having an aperture through which said stud extends, the edge of said aperture entering and engaging the notch of said stud, whereby the pan is locked upon the conveyer to prevent separation during the inverted return run.

4. In a conveyer having a carrying run and an inverted return run, a movable carrying member positioned substantially horizontally during said carrying run, a removable and transversely shiftable pan member supported and advanced by said carrying member and having a portion resting thereon, a stud projecting substantially vertically from one of said members, the other of said members having an aperture through which said stud extends, and said stud having a notch in its side facing one side of the conveyer, the edge of said aperture entering and engaging said notch, whereby the pan member is locked upon the carrying member to prevent separation of said members during their inverted return run.

5. In a conveyer having a carrying run and an inverted return run, a movable carrying member positioned substantially horizontally during said carrying run, a removable pan member supported and advanced by said carrying member and having a portion resting thereon, a stud projecting substantially vertically from one of said members, the other of said members having an aperture through which said stud extends, said stud having a notch in its side facing one side of the conveyer, and a spring acting between said members to shift the pan member transversely of the conveyer to cause the edge of said aperture to engage said notch, whereby the pan member is locked upon the carrying member to prevent separation of said members during their inverted return run.

LAURENCE M. SIGLER.
JAMES C. GILL.